(12) United States Patent
Nordin et al.

(10) Patent No.: US 8,946,555 B2
(45) Date of Patent: *Feb. 3, 2015

(54) COMMUNICATION CABLE WITH IMPROVED CROSSTALK ATTENUATION

(75) Inventors: Ronald A. Nordin, Naperville, IL (US); Masud Bolouri-Saransar, Orland Park, IL (US); Royal O. Jenner, Tinley Park, IL (US); Timothy J. Houghton, II, Chicago, IL (US); Thomas G. McLaughlin, Taylor Mill, KY (US); Kenneth E. Cornelison, Cincinnati, OH (US); David P. Camp, II, Florence, KY (US)

(73) Assignee: Panduit Corp., Tinley Park, IL (US)

( * ) Notice: Subject to any disclaimer, the term of this patent is extended or adjusted under 35 U.S.C. 154(b) by 291 days.

This patent is subject to a terminal disclaimer.

(21) Appl. No.: 13/539,593

(22) Filed: Jul. 2, 2012

(65) Prior Publication Data

US 2012/0267142 A1  Oct. 25, 2012

Related U.S. Application Data

(63) Continuation of application No. 12/399,331, filed on Mar. 6, 2009, now Pat. No. 8,217,267.

(60) Provisional application No. 61/034,312, filed on Mar. 6, 2008.

(51) Int. Cl.
*H01B 7/00* (2006.01)
*H01B 11/10* (2006.01)
*H01B 7/18* (2006.01)

(52) U.S. Cl.
CPC .......... *H01B 11/1008* (2013.01); *H01B 7/1845* (2013.01)
USPC ............... 174/102 R; 174/102 SP; 174/113 C

(58) Field of Classification Search
CPC ............ H01B 7/00; H01B 7/04; H01B 11/00; H01B 11/02; H01B 11/04; H01B 11/06; H01B 11/08; H01B 11/1008; H01B 11/22
USPC ............ 174/36, 110 R, 113 R, 113 C, 114 R, 174/114 S, 115, 116 R, 102 R, 108, 109
See application file for complete search history.

(56) References Cited

U.S. PATENT DOCUMENTS

| | | | |
|---|---|---|---|
| 1,959,339 A * | 5/1934 | Bennett ........................ | 174/26 R |
| 2,796,463 A * | 6/1957 | Mallinckrodt .................. | 178/45 |
| 3,312,774 A | 4/1967 | Peterson | |
| 3,573,676 A * | 4/1971 | Mayer ........................... | 333/202 |
| 3,794,750 A | 2/1974 | Garshick | |
| 3,896,380 A * | 7/1975 | Martin ......................... | 455/523 |
| 4,129,841 A * | 12/1978 | Hildebrand et al. .......... | 333/237 |

(Continued)

FOREIGN PATENT DOCUMENTS

| | | |
|---|---|---|
| JP | S6317192 U | 11/1988 |
| TW | 108111 | 2/1989 |
| WO | 2006105166 A2 | 10/2006 |

*Primary Examiner* — William H Mayo, III
(74) *Attorney, Agent, or Firm* — Christopher S. Clancy; Yuri Astvatsaturov

(57) ABSTRACT

Methods and apparatus directed towards communication cables and barrier tapes for use in communication cables are disclosed herein. In an embodiment, the present invention employs conductive segments within the communication cables and/or on the barrier tape.

29 Claims, 16 Drawing Sheets

(56) References Cited

U.S. PATENT DOCUMENTS

| | | | |
|---|---|---|---|
| 4,236,779 A | 12/1980 | Tang | |
| 4,339,733 A * | 7/1982 | Smith | 333/237 |
| 4,684,437 A | 8/1987 | Donelon et al. | |
| 4,788,088 A * | 11/1988 | Kohl | 428/34.5 |
| 5,465,395 A * | 11/1995 | Bartram | 455/523 |
| 5,473,336 A * | 12/1995 | Harman et al. | 343/790 |
| 6,207,901 B1 * | 3/2001 | Smith et al. | 174/102 R |
| 6,392,152 B1 | 5/2002 | Mottine, Jr. et al. | |
| 6,998,537 B2 * | 2/2006 | Clark et al. | 174/113 R |
| 7,332,676 B2 * | 2/2008 | Sparrowhawk | 174/102 R |
| 7,335,837 B2 | 2/2008 | Pfeiler et al. | |
| 2006/0048961 A1 * | 3/2006 | Pfeiler et al. | 174/36 |
| 2007/0037419 A1 | 2/2007 | Sparrowhawk | |

* cited by examiner

US 8,946,555 B2

COMMUNICATION CABLE WITH IMPROVED CROSSTALK ATTENUATION

CROSS-REFERENCE TO RELATED APPLICATIONS

This application is a continuation of U.S. application Ser. No. 12/399,331 filed Mar. 6, 2009, which claims the benefit of provisional U.S. Patent Application No. 61/034,312, filed Mar. 6, 2008, which is incorporated herein in its entirety.

FIELD OF THE INVENTION

The present invention relates to communication cables, and more particularly to methods and apparatus to enhance the attenuation of crosstalk associated with such cables.

BACKGROUND OF THE INVENTION

As networks become more complex and have a need for higher bandwidth cabling, attenuation of cable-to-cable crosstalk (or "alien crosstalk") becomes increasingly important to provide a robust and reliable communication system. Alien crosstalk is primarily coupled electromagnetic noise that can occur in a disturbed cable arising from signal-carrying cables that run near the disturbed cable. Additionally, crosstalk can occur between twisted pairs within a particular cable, which can additionally degrade a communication system's reliability.

SUMMARY OF THE INVENTION

In some embodiments, the present invention relates to the use of multiple layers of material having conductive segments as a method of enhancing the attenuation of alien crosstalk. In one embodiment, the present invention comprises a double-layered metal patterned film (or barrier tape) that is wrapped around the wire pairs of a high performance 10 Gb/s (gigabit/second) unshielded twisted pair (UTP) cable. In general, the present invention can be used in communication cable of higher or lower frequencies, such as (TIA/EIA standards) Category 5e, Category 6, Category 6A, Category 7, and copper cabling used for even higher frequency or bit rate applications, such as, 40 Gb/s and 100 Gb/s. The conductive segments in the layers are positioned so that gaps in one layer are substantially overlain by conductive segments of a neighboring layer. The multiple layers reduce crosstalk while gaps between the conductive segments reduce the emission of electromagnetic energy from the conductive material and also reduce the susceptibility of the conductive material to radiated electromagnetic energy. The present invention solves deficiencies in the prior art of UTP cable to reduce cable-to-cable crosstalk, or other types of crosstalk. Embodiments of the present invention may be applied to other types of cable in addition to UTP cable.

BRIEF DESCRIPTION OF THE DRAWINGS

For the purpose of facilitating an understanding of the inventions, the accompanying drawings and description illustrate embodiments thereof, from which the inventions, structure, construction and operation, and many related advantages may be readily understood and appreciated.

DETAILED DESCRIPTION OF THE EMBODIMENTS

Figure 1:
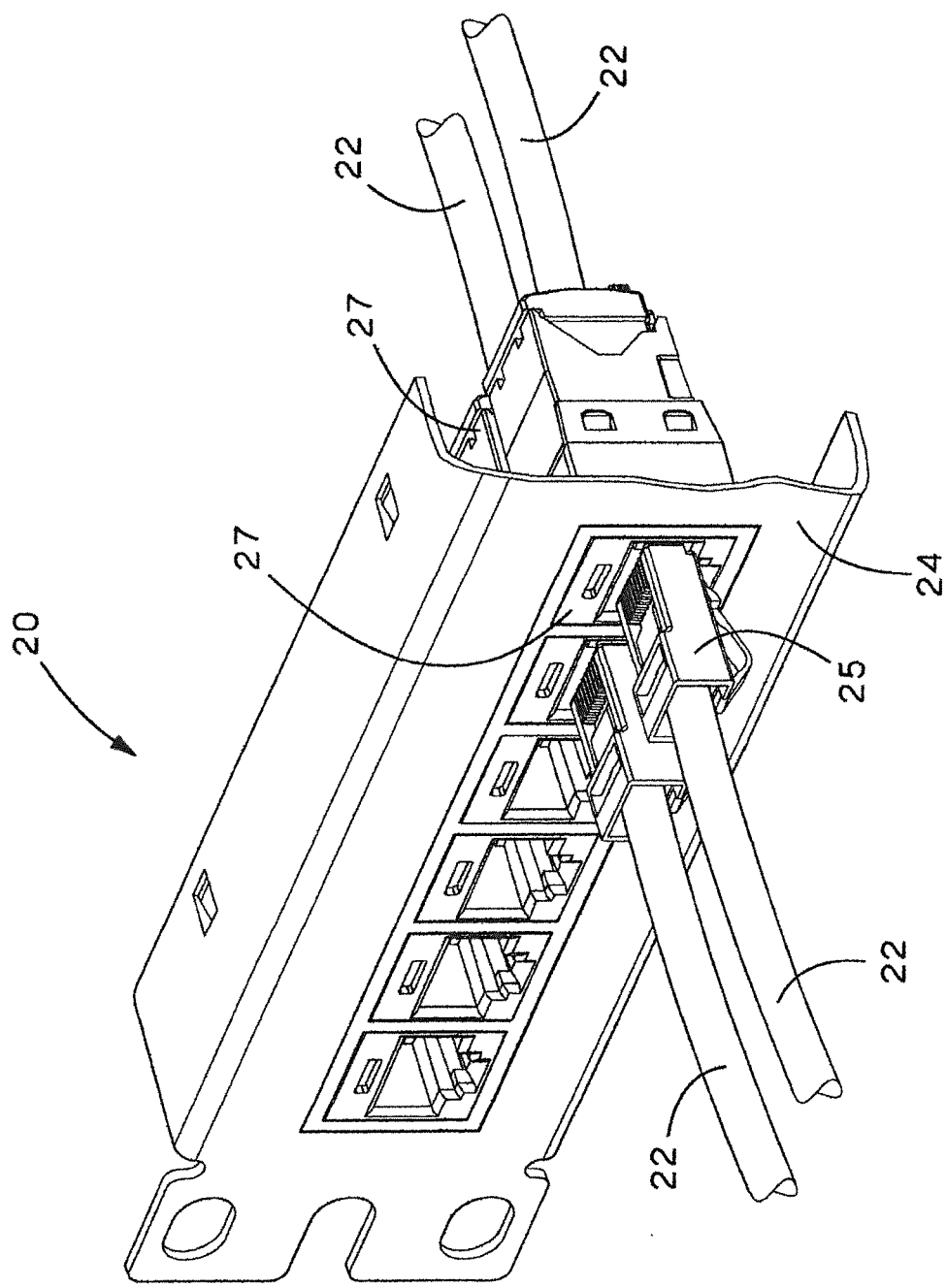
FIG. 1 is a schematic view of an embodiment of a communication system including multiple communication cables according to the present invention.

Referring now to the drawings, and more particularly to FIG. 1, there is shown a communication system 20, which includes at least one communication cable 22, connected to equipment 24. Equipment 24 is illustrated as a patch panel in FIG. 1, but the equipment can be passive equipment or active equipment. Examples of passive equipment can be, but are not limited to, modular patch panels, punch-down patch panels, coupler patch panels, wall jacks, etc. Examples of active equipment can be, but are not limited to, Ethernet switches, routers, servers, physical layer management systems, and power-over-Ethernet equipment as can be found in data centers/telecommunications rooms; security devices (cameras and other sensors, etc.) and door access equipment; and telephones, computers, fax machines, printers and other peripherals as can be found in workstation areas. Communication system 20 can further include cabinets, racks, cable management and overhead routing systems, for example.

Communication cable 22 can be in the form of an unshielded twisted pair (UTP) cable, and more particularly a Category 6A cable which can operate at 10 Gb/s, as is shown more particularly in FIG. 2, and which is described in more detail below. However, the present invention can be applied to and/or implemented in a variety of communications cables, as have already been described, as well as other types of cables. Cables 22 can be terminated directly into equipment 24, or alternatively, can be terminated in a variety of plugs 25 or jack modules 27 such as RJ45 type, jack module cassettes, Infiniband connectors, RJ21, and many other connector types, or combinations thereof. Further, cables 22 can be processed into looms, or bundles, of cables, and additionally can be processed into preterminated looms.

Communication cable 22 can be used in a variety of structured cabling applications including patch cords, backbone cabling, and horizontal cabling, although the present invention is not limited to such applications. In general, the present invention can be used in military, industrial, telecommunications, computer, data communications, and other cabling applications.

Figure 2:
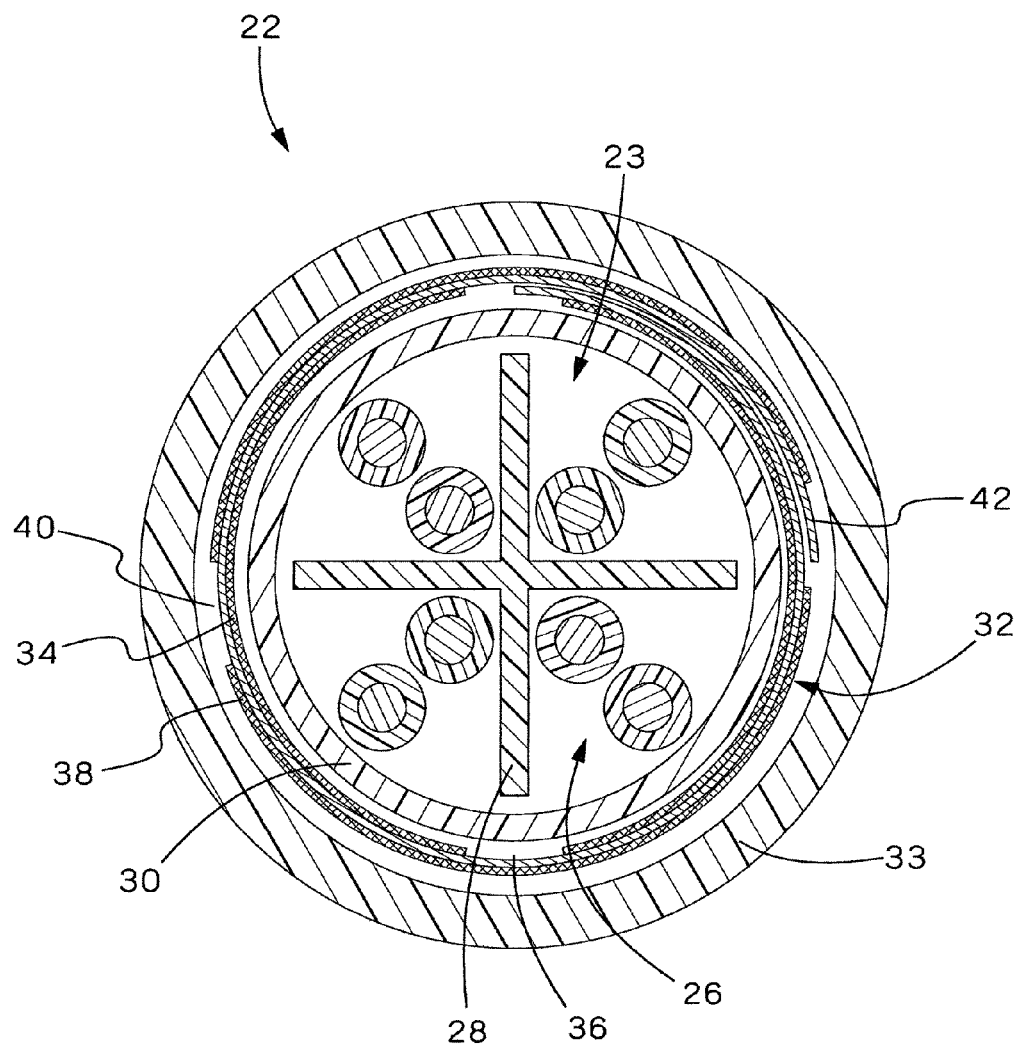
FIG. 2 is a cross-sectional view of one of the communication cables of FIG. 1.
Figure 3:
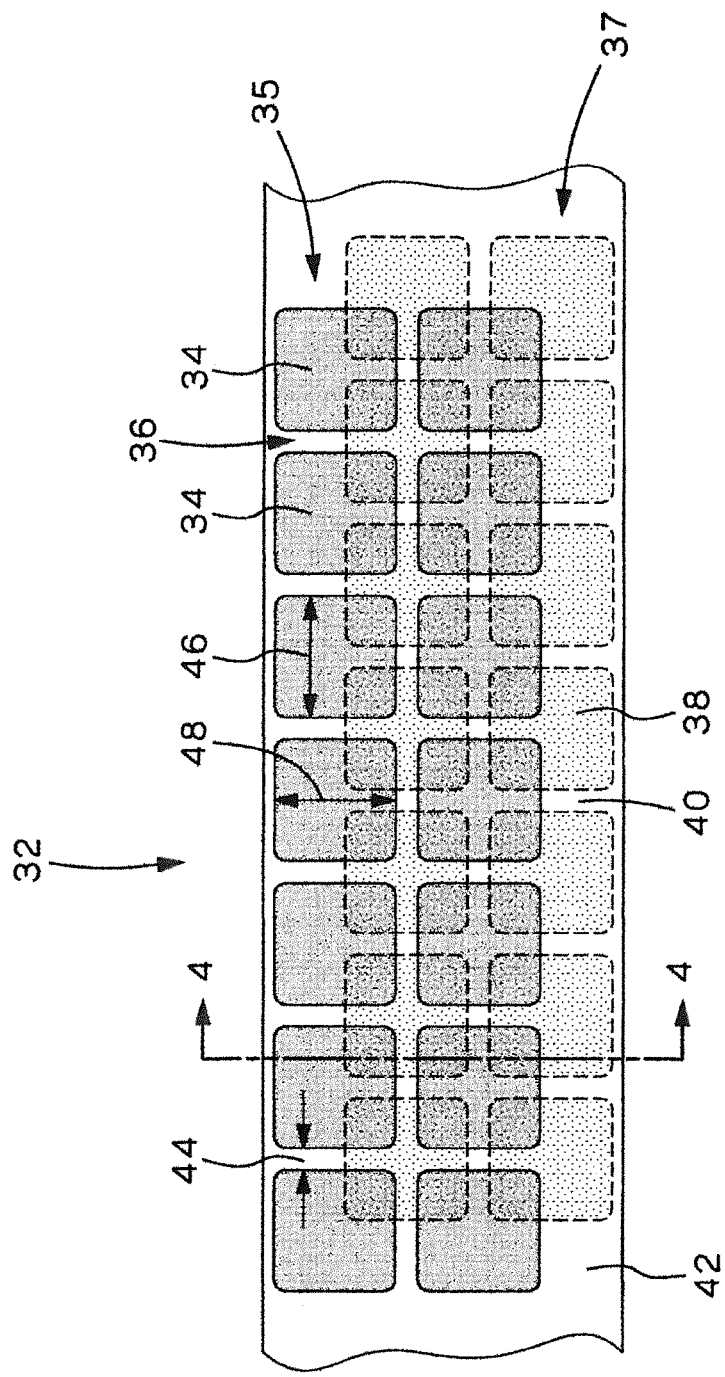
FIG. 3 is a fragmentary plan view of an embodiment of a barrier tape according to the present invention and used in the cables of FIGS. 1 and 2.
Figure 4:
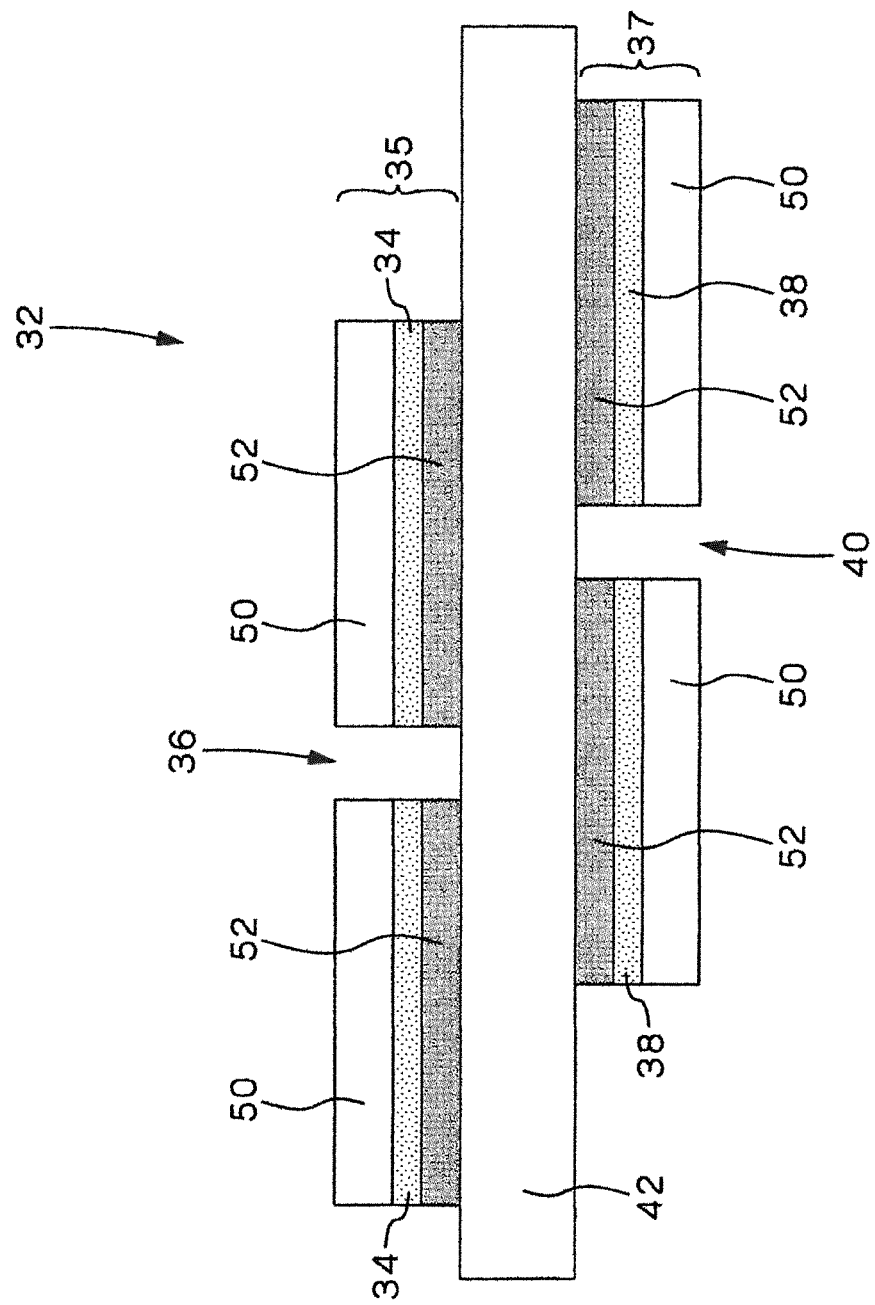
FIG. 4 is a cross-sectional view of the barrier tape of FIG. 3, taken along section 4-4 in FIG. 3.

Referring more particularly to FIG. 2, there is shown a transverse cross-section of cable 22. Cable 22 includes an inner core 23 of four twisted conductive wire pairs 26 that are typically separated with a crossweb 28. An inner insulating layer 30 (e.g., a plastic insulating tape or an extruded insulating layer, for example a 10 mil thick inner insulating jacket material) surrounds the conductive wire pairs 26 and cross web 28. A wrapping of barrier tape 32 surrounds the inner insulating layer 30. Barrier tape 32 can be helically wound around the insulating layer 30. Cable 22 also can include an outer insulating jacket 33. The barrier tape 32 is shown in a condensed version for simplicity in FIG. 2, illustrating only an insulating substrate 42 and conductive segments 34 and 38. Referring also to FIGS. 3 and 4, and as is discussed in more detail below, barrier tape 32 includes a first barrier layer 35 (shown in FIG. 2 as a inner barrier layer) comprising conductive segments 34 separated by gaps 36; a second barrier layer 37 (shown in FIG. 2 as an outer barrier layer) comprising conductive segments 38 separated by gaps 40 in the conductive material of segments 38; and an insulating substrate 42 separating conductive segments 34 and gaps 36 of the first conductive layer from conductive segments 38 and gaps 40 of the second conductive layer. The first and second barrier layers, and more particularly conductive segments 34 and conductive segments 38, are staggered within the cable so that gaps 40 of the outer barrier layer align with the conductive segments 34 of the inner conductive layer. Barrier tape 32 can be helically or spirally wound around the inner insulating layer 30. Alternatively, the barrier tape can be applied around the insulative layer in a non-helical way (e.g., cigarette or longitudinal style).

Outer insulating jacket 33, can be 15 mil thick (however, other thicknesses are possible). The overall diameter of cable 22 can be under 300 mils, for example; however, other thicknesses are possible.

FIG. 3 is a plan view of barrier tape 32 illustrating the patterned conductive segments on an insulative substrate where two barrier layers 35 and 37 of discontinuous conductive material are used. The conductive segments 34 and 38 are arranged as a mosaic in a series of plane figures along both the longitudinal and transverse direction of an underlying substrate 42. As described, the use of multiple barrier layers of patterned conductive segments facilitates enhanced attenuation of alien crosstalk, by effectively reducing coupling by a cable 22 to an adjacent cable, and by providing a barrier to coupling from other cables. The discontinuous nature of the conductive segments 34 and 38 reduces or eliminates radiation from the barrier layers 35 and 37. In the embodiment shown, a double-layered gridlike metal pattern is incorporated in barrier tape 32, which spirally wraps around the twisted wire pairs 26 of the exemplary high performance 10 Gb/s cable. The pattern may be chosen such that conductive segments of a barrier layer overlap gaps 36, 40 from the neighboring barrier layer. In FIGS. 3 and 4, for example, both the top 35 and bottom 37 barrier layers have conductive segments that are arranged in a series of squares (with rounded corners) approximately 330 mil×330 mil with a 60 mil gap size 44 between squares. According to one embodiment, the rounded corners are provided with a radius of approximately 1/32".

Referring to the upper barrier layer 35, the performance of any single layer of conductive material is dependent on the gap size 44 of the discontinuous pattern and the longitudinal length 46 of the discontinuous segments and can also be at least somewhat dependent on the transverse widths 48 of the conductive segments. In general, the smaller the gap size 44 and longer the longitudinal length 46, the better the cable-to-cable crosstalk attenuation will be. However, if the longitudinal pattern length 46 is too long, the layers of discontinuous conductive material will radiate and be susceptible to electromagnetic energy in the frequency range of relevance. One solution is to design the longitudinal pattern length 46 so it is slightly greater than the average pair lay of the twisted conductive wire pairs within the surrounded cable but smaller than one quarter of the wavelength of the highest frequency signal transmitted over the wire pairs. The pair lay is equal to the length of one complete twist of a twisted wire pair.

Typical twist lengths (i.e., pair lays) for high-performance cable (e.g., 10 Gb/s) are in the range of 0.8 cm to 1.3 cm. Hence the conductive segment lengths are typically within the range of from approximately 1.3 cm to approximately 10 cm for cables adapted for use at a frequency of 500 MHz. At higher or lower frequencies, the lengths will vary lower or higher, respectively.

Further, for a signal having a frequency of 500 MHz, the wavelength will be approximately 40 cm when the velocity of propagation is 20 cm/ns. At this wavelength, the lengths of the conductive segments of the barrier layers should be less than 10 cm (i.e., one quarter of a wavelength) to prevent the conductive segments from radiating electromagnetic energy.

It is also desirable that the transverse widths 48 of the conductive segments "cover" the twisted wire pairs as they twist in the cable core. In other words, it is desirable for the transverse widths 48 of the conductive segments to be wide enough to overlie a twisted pair in a radial direction outwardly from the center of the cable. Generally, the wider the transverse widths 48, the better the cable-to-cable crosstalk attenuation is. It is further desirable for the barrier tape 32 to be helically wrapped around the cable core at approximately the same rate as the twist rate of the cable's core. For high-performance cable (e.g., 10 Gb/s), typical cable strand lays (i.e., the twist rate of the cable's core) are in the range of from approximately 6 cm to approximately 12 cm. It is preferred that barrier tapes according to the present invention are wrapped at the same rate as the cable strand lay (that is, one complete wrap in the range of from approximately 6 cm to approximately 12 cm). However, the present invention is not limited to this range of wrap lengths, and longer or shorter wrap lengths may be used.

A high-performing application of a barrier tape of discontinuous conductive segments is to use one or more conductive barrier layers to increase the cable-to-cable crosstalk attenuation. For barriers of multiple layers, barrier layers are separated by a substrate so that the layers are not in direct electrical contact with one another. Although two barrier layers 35 and 37 are illustrated, the present invention can include a single barrier layer, or three or more barrier layers. (See FIG. 10 for example.)

FIG. 4 illustrates a cross-sectional view of barrier tape 32 in more detail as employed with two barrier layers 35 and 37. Each barrier layer includes a substrate 50 and conductive segments 34 or 38. The substrate 50 is an insulative material and can be approximately 0.7 mils thick, for example. The layer of conductive segments contains plane figures, for example squares with rounded corners, of aluminum having a thickness of approximately 0.35 mils. According to other embodiments of the present invention, the conductive segments may be made of different shapes such as regular or irregular polygons, other irregular shapes, curved closed shapes, isolated regions formed by conductive material cracks, and/or combinations of the above. Other conductive materials, such as copper, gold, or nickel may be used for the conductive segments. Semiconductive materials may be used in those areas as well. Examples of the material of the insulative substrate include polyester, polypropylene, polyethylene, polyimide, and other materials.

The conductive segments 34 and 38 are attached to a common insulative substrate 42 via layers of spray glue 52. The layers of spray glue 52 can be 0.5 mils thick and the common layer of insulative substrate 42 can be 1.5 mil thick, for example. Given the illustrated example thicknesses for the layers, the overall thickness of the barrier tape 32 of FIG. 4 is approximately 4.6 mils. It is to be understood that different material thicknesses may be employed for the different layers. According to some embodiments, it is desirable to keep the distance between the two layers of conductive segments 34 and 38 small so as to reduce capacitance between those layers.

When using multiple layers of discontinuous conductive material as barrier material the gap coverage between layers assists in decreasing cable-to-cable crosstalk. This may be best understood by examining the capacitive and conductive coupling between cables.

Figure 5:
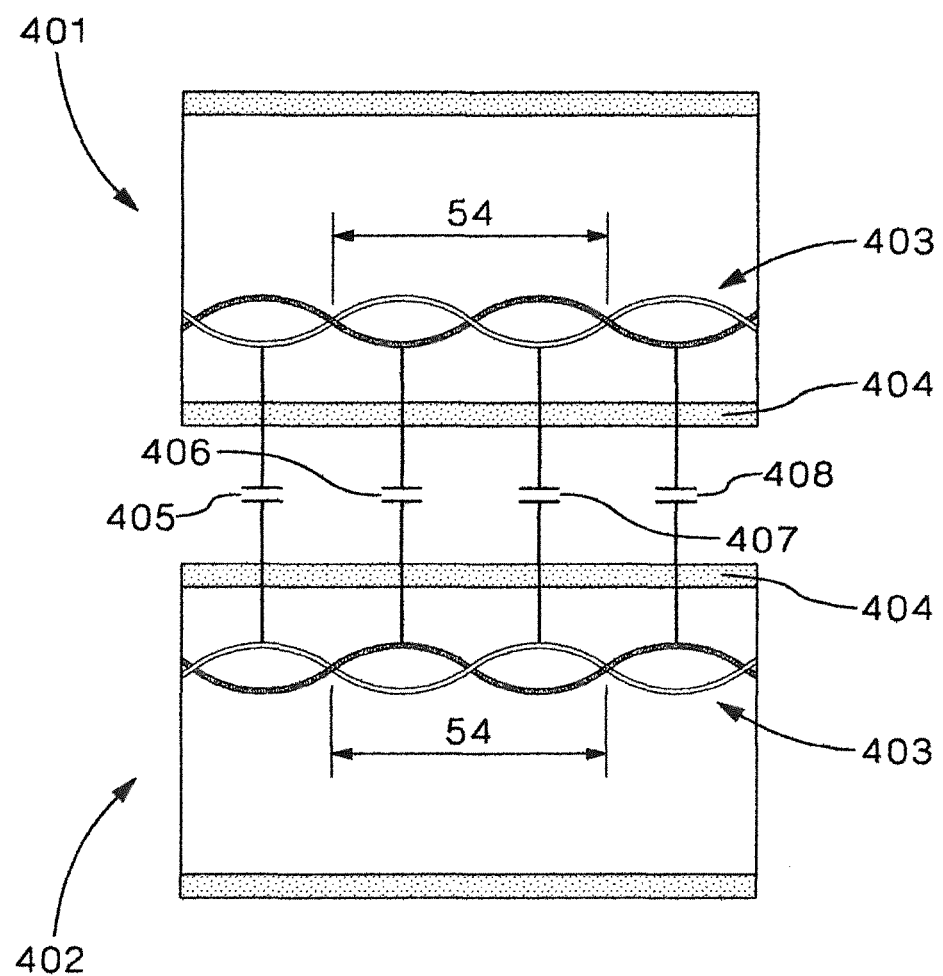
FIG. 5 is a longitudinal cross-sectional view of the parasitic capacitive modeling of two prior art cables.

FIG. 5 illustrates a model of parasitic capacitive coupling of two prior art cables 401 and 402. Here, the two cables 401 and 402 employ insulating jackets 404 as a method of attenuating cable-to-cable crosstalk between the two twisted pairs of wire 403 of standard 10 G b/s Ethernet twist length 54 (pair lay). The resultant parasitic capacitive coupling, as illustrated by modeled capacitors 405-408, creates significant cable-to-cable crosstalk. Although capacitors 405-408 are shown as lumped capacitive elements for the purpose of the FIG. 5 model, they are in fact a distributed capacitance.

Figure 6:
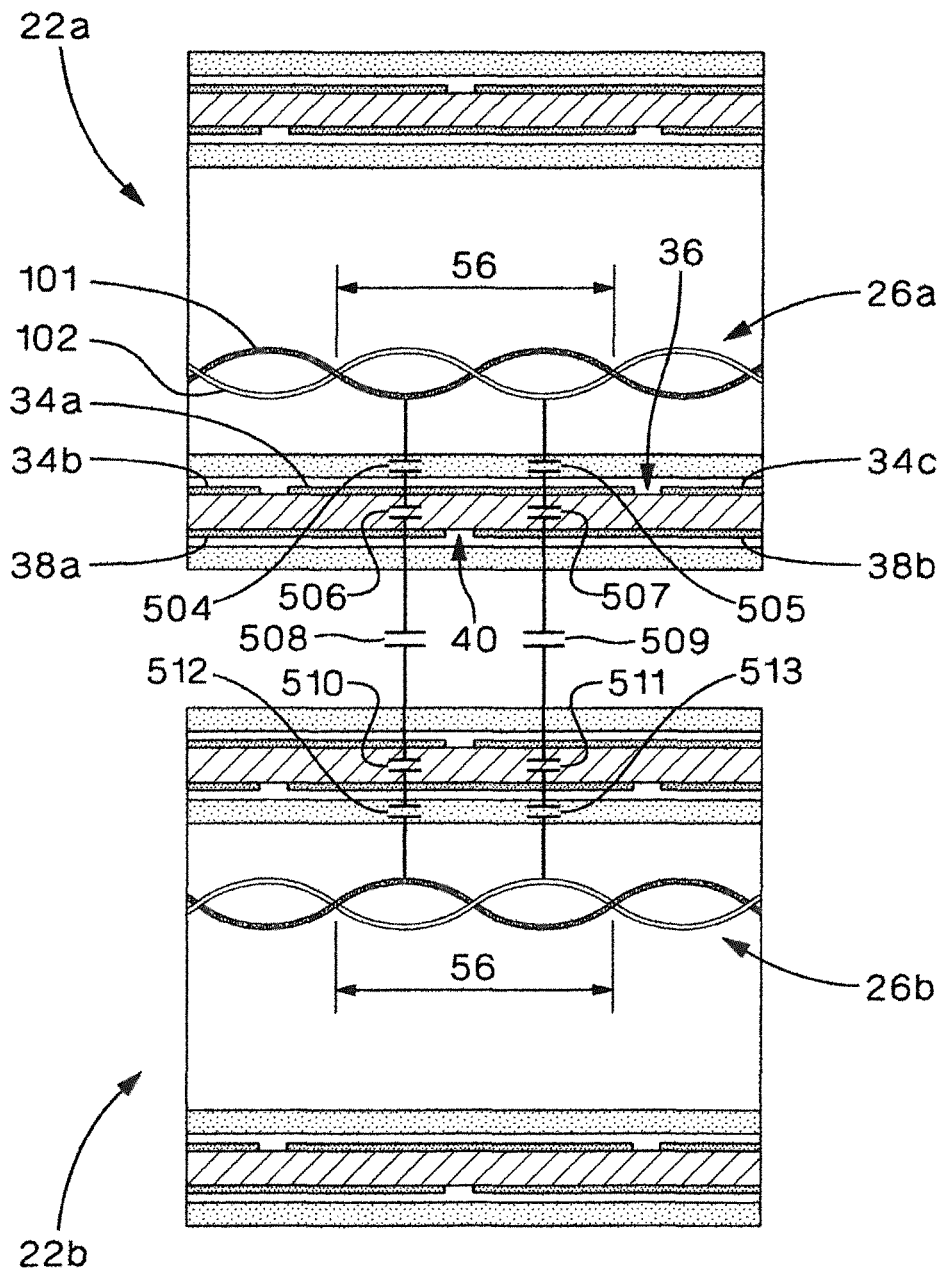
FIG. 6 is a longitudinal cross-sectional view of the parasitic capacitive modeling of two cables according to an embodiment of the present invention.

In contrast, FIG. 6 illustrates the parasitic capacitive coupling of two cables 22a and 22b using the barrier technique of the present invention. Though the overall effect results from a distributed capacitance, lumped element capacitor models are shown for the purpose of illustrating the distributed parasitic capacitive coupling. First and second twisted wires 101 and 102 of the twisted pair 26a carry a differential signal, and can be modeled as having opposite polarities. The "positive" polarity signal carried by the first wire 101 and the "negative" polarity signal carried by the second wire 102 couple approximately equally to the conductive segment 34a. This coupling is modeled by the capacitors 504 and 505. As a result, very little net charge is capacitively coupled from the twisted pair 26 onto the conductive segment 34a, resulting in a negligible potential. What little charge is coupled onto the conductive segment 34a is further distributed by coupling onto the conductive segments 38a and 38b in the outer barrier layer of the cable 22a via modeled capacitors 506 and 507. Because the conductive segments 38a and 38b are also capacitively coupled with additional inner conductive segments 34b and 34c, the amount of capacitive coupling is further mitigated due to cancellation effects resulting from the opposite polarities of the twisted wires 101 and 102. Similar cancellation effects carry through the additional modeled capacitors 508-513, so that the overall capacitive coupling between the twisted pair 26a of the first cable 22a and the twisted pair 26b of the second cable 22b is substantially decreased as compared to a prior art system. The spacing of the gaps 36 and 40 in the two barrier layers of a barrier tape greatly reduces the opportunity for direct cable-to-cable capacitive coupling.

Figure 7:
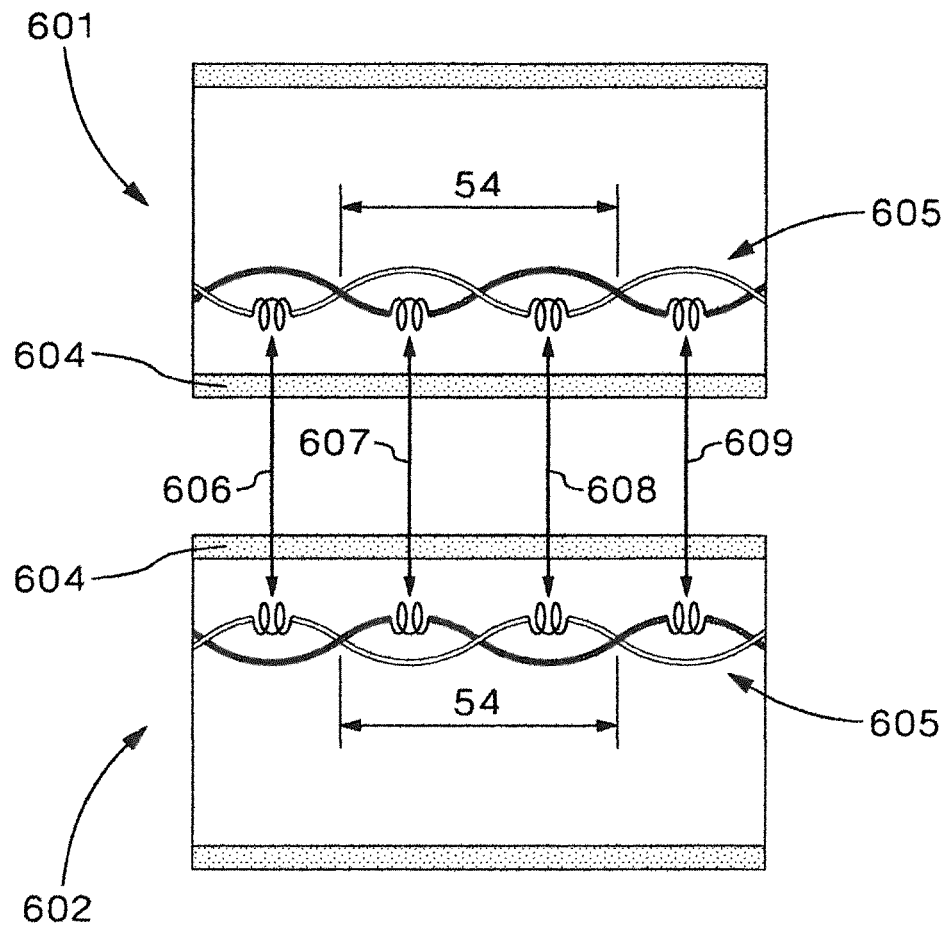
FIG. 7 is a longitudinal cross-sectional view of a parasitic inductive modeling of two prior art cables.
Figure 8:
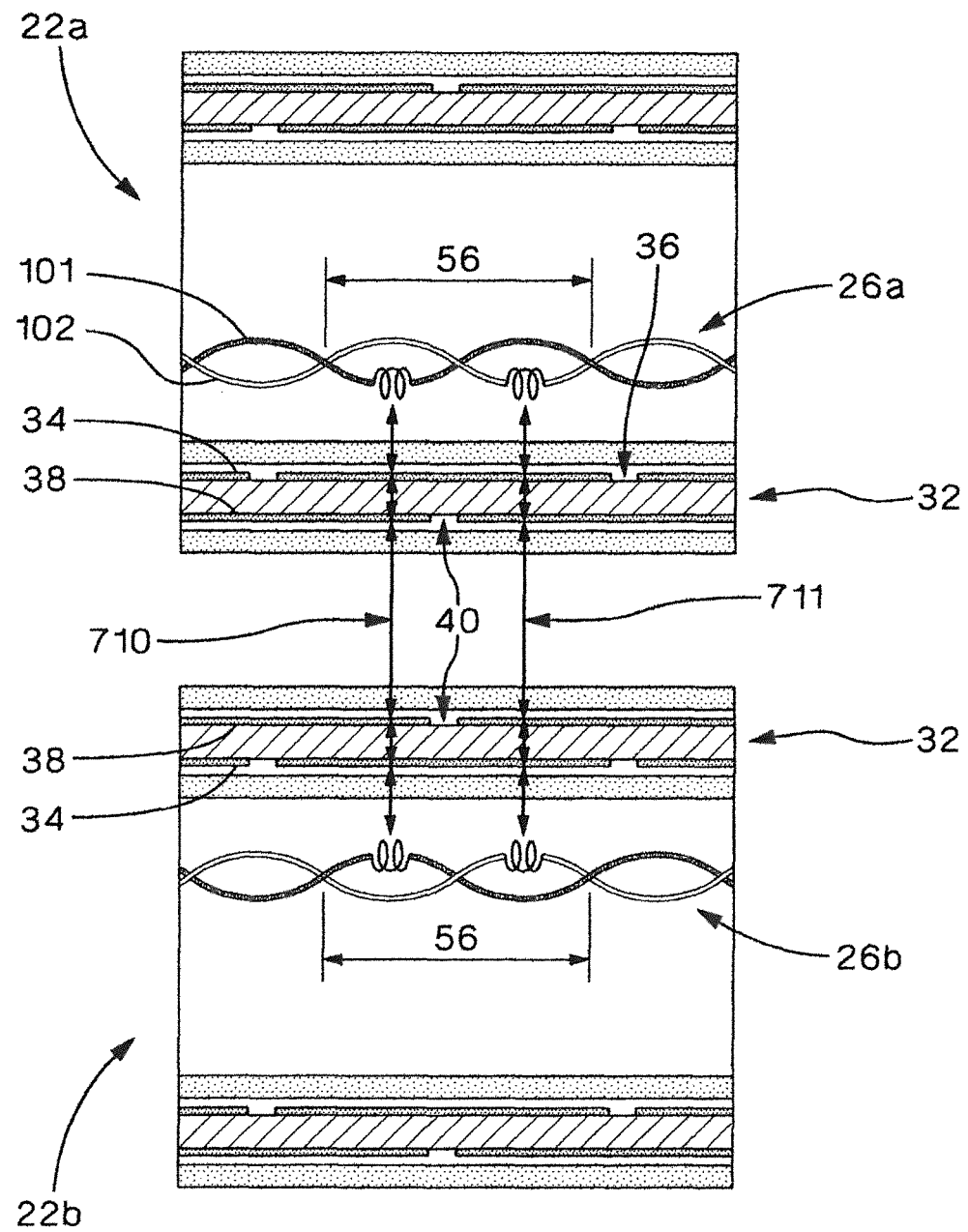
FIG. 8 is a longitudinal cross-sectional view of a parasitic inductive modeling of two cables according to an embodiment of the present invention

Turning to inductive modeling, FIG. 7 illustrates the parasitic distributed inductive modeling of two prior art cables. In FIGS. 7 and 8, currents in the conductors produce magnetic fields and the distributed inductance of the conductors results in inductive coupling shown by the arrows. For purposes of illustration, specific regions of the magnetic fields are indicated by arrows, but the magnetic fields are actually distributed throughout the illustrated areas. Here, both cables 601 and 602 employ only insulating jackets 604 as a method of attenuating cable-to-cable crosstalk between the two twisted pairs of wire 605 of standard 10 Gb/s Ethernet twist length 54 (pair lay). The resultant parasitic inductive coupling modeled at 606-609 creates significant cable-to-cable crosstalk.

FIG. 8 illustrates inductive modeling of two cables using the barrier techniques as proposed by the present invention. The two twisted wires of cables 22a and 22b respectively contain twisted pairs 26a and 26b and same standard 10 Gb/s Ethernet twist length 56 (pair lay), as the prior art model. However, the two cables 22a and 22b are protected with barrier tape 32. The barrier layers 35 and 37 contain respective gaps 36 and 40 in the conductive material to prevent the conductive material segments 34 and 38 from radiating. The conductive segments are staggered within the cable so that most gaps in the conductive material are aligned conductive segments of the adjacent layer.

Magnetic fields are induced in the first cable 22a by the twisted wire pair 26a. However, as the magnetic fields pass through the inner barrier layer of the barrier tape 32, they create eddy currents in the conductive segments, reducing the extent of magnetic coupling 710 and 711, and reducing cable-to-cable crosstalk. However, the need for gaps 36 and 40 in the barrier layers 35 and 37 results in some portions of the magnetic fields passing near a boundary or gap. Eddy currents are not as strongly induced near a boundary or gap, resulting in less reduction of the passing magnetic field in these regions.

One solution again is to use multiple barrier layers 35 and 37 so that a gap from one layer is covered by conductive material from the adjacent layer. The second cable 22b illustrates an outer barrier layer (particularly conductive segment 38) covering a gap 36 in the inner conductive layer 35. As discussed above, the magnetic fields passing through the conductive layer 35 and 37 do not lose much energy because eddy currents are not as strongly induced near boundaries or gaps 36 and 40. However, by ensuring that a gap 36 in the inner conductive layer 35 is covered by a conductive segment from the outer barrier layer, the magnetic fields passing through the inner barrier layer create stronger eddy currents while passing through the outer barrier layer, therefore reducing their energy and reducing cable-to-cable crosstalk. Therefore, it is desirable to arrange the gaps 36 and 40 of the barrier layers to be aligned with conductive segments from an adjacent barrier layer; however, some gaps in the barrier layers may remain uncovered without significantly affecting the cable-to-cable crosstalk attenuation of the present invention.

Figure 9:
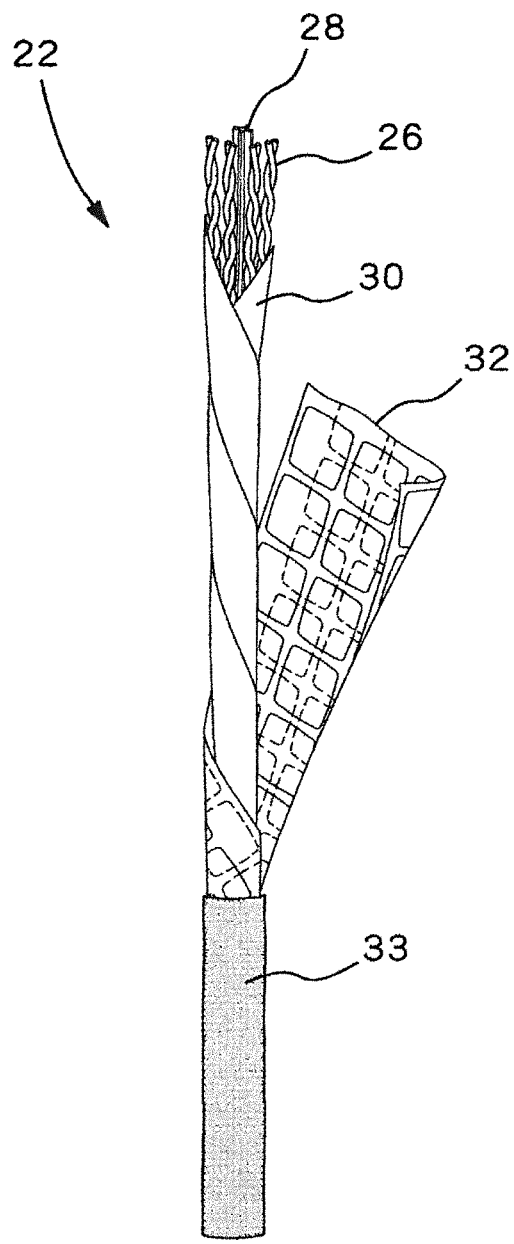
FIG. 9 is a perspective view of an embodiment of the cable of FIG. 1, illustrating the spiral nature of the barrier tape installed within the cable.

FIG. 9 illustrates how the barrier tape 32 is spirally wound between the insulating layer 30 and the outer jacket 33 of the cable 22. Alternatively, the barrier tape can be applied around the insulative layer in a non-helical way (e.g., cigarette or longitudinal style). It is desirable for the helical wrapping of the barrier tape 32 to have a wrap rate approximately equal to the core lay length of the cable 22 (i.e., the rate at which the twisted pairs 26 of the cable wrap around each other). However, in some embodiments the helical wrapping of the barrier tape 32 may have a wrap rate greater or less than the core lay length of the cable 22.

Figure 10:
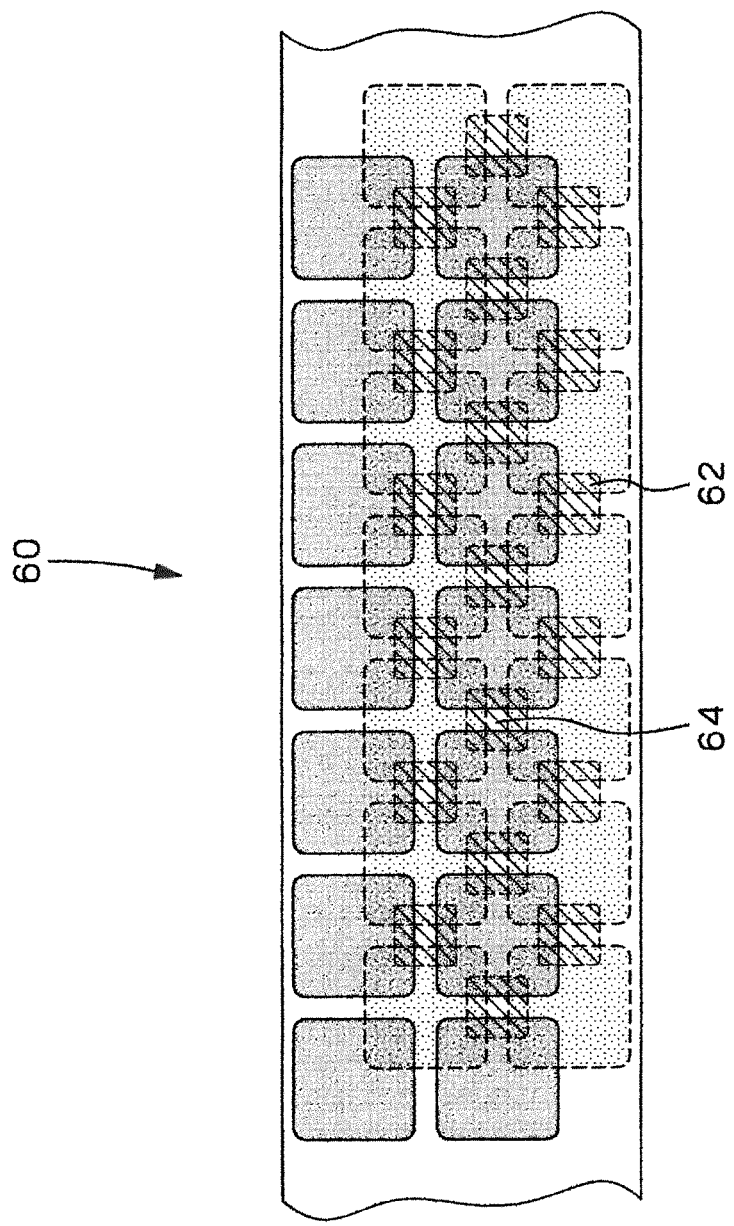
FIG. 10 is a fragmentary plan view of an embodiment of a barrier tape according to the present invention in the form of a triple layer patterned discontinuous conductive material on an insulative substrate material.

FIG. 10 illustrates another embodiment of a barrier tape 60 according to the present invention that includes a third conductive layer with conductive segments 62 to specifically cover gaps 64. Barrier tape 60 can have a structure similar to that shown in FIG. 4, but with an additional barrier layer, and intervening substrate and glue layer, where the conductive segments 62 overlap gaps 64 as shown. The present invention is not limited to the embodiments shown, but can also include embodiments with a single barrier layer, or four or more barrier layers, in the barrier tape.

Figure 11:
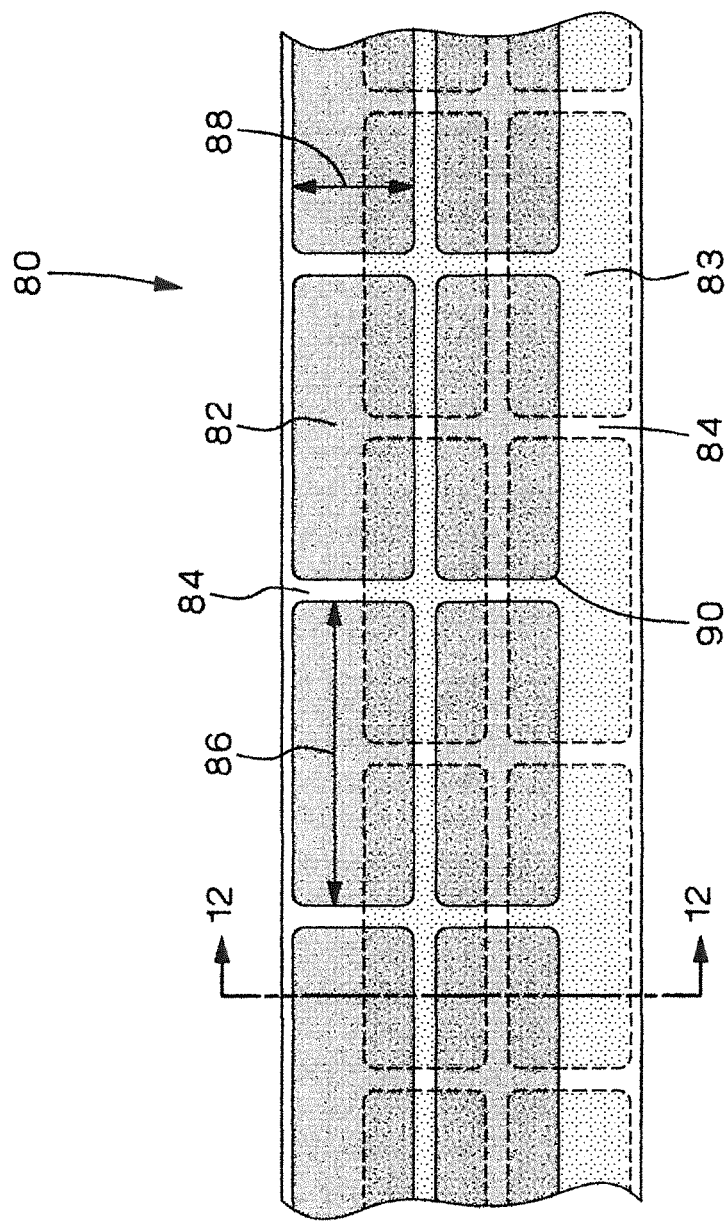
FIG. 11 is a fragmentary plan view of another embodiment of a barrier tape according to the present invention.

FIG. 11 illustrates another embodiment of a barrier tape 80 according to the present invention. The barrier tape 80 is similar to the barrier tape 32 shown and described above, except that the barrier tape 80 is provided with upper and lower rectangular conductive segments 82 and 83. The rectangular segments on each layer are separated by gaps 84. The rectangular conductive segments 82 and 83 have a longitudinal length 86 and a transverse width 88. According to one embodiment, the longitudinal length 86 of each rectangular conductive segment 82 is approximately 822 mils, and the transverse width 88 is approximately 332 mils. In this embodiment, the gaps 84 are approximately 60 mils wide. As the conductive segment shape and size can be varied, so can the gap width. For example, the gap can be 55 mils or other widths. In general, the higher the ratio of the longitudinal lengths of the conductive segments to the gap widths, the better the crosstalk attenuation. Different dimensions may be provided, however, depending on the desired performance characteristics of the cable. The rectangular conductive segments 82 are provided with rounded corners 90, and in the illustrated embodiment the rounded corners 90 have a radius of approximately 1/32".

It is desirable for conductive segments according to the present invention to be provided with curved corners in order to reduce the chances of undesirable field effects that could arise if sharper corners are used. According to some embodiments of the present invention, curved corners having radii in the range of 10 mils to about 500 mils are preferable, though larger or smaller radii may be beneficial in certain embodiments.

Figure 12:
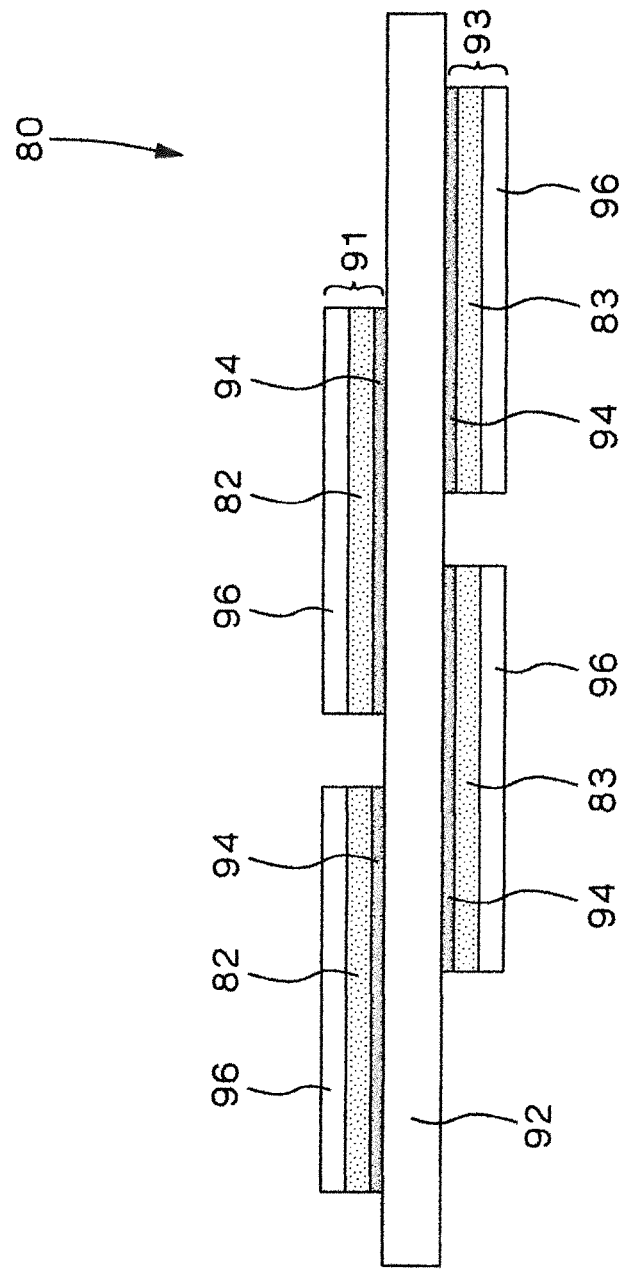
FIG. 12 is a cross-sectional view of the barrier tape of FIG. 11 taken along the line 12-12 of FIG. 11.

FIG. 12 is a cross-sectional view of the barrier tape 80 taken along the line 12-12 of FIG. 11. The barrier tape 80 comprises an insulative substrate 92 and upper and lower barrier layers 91 and 93 having rectangular conductive segments 82 and 83. The rectangular conductive segments 82 and 83 are attached to the substrate 92 by a layer of spray glue 94 and are bordered by outer substrate layers 96. According to one embodiment, the insulative substrate 92 has a thickness of about 1.5 mils, the spray glue layers 94 have thicknesses of approximately 0.5 mils, the conductive segments 82 and 83 have thicknesses of about 1 mil, and the outer substrate layers 96 have thicknesses of about 1 mil. Other thicknesses may be used for the layers depending on the desired physical and performance qualities of the barrier tape 80.

Figure 13:
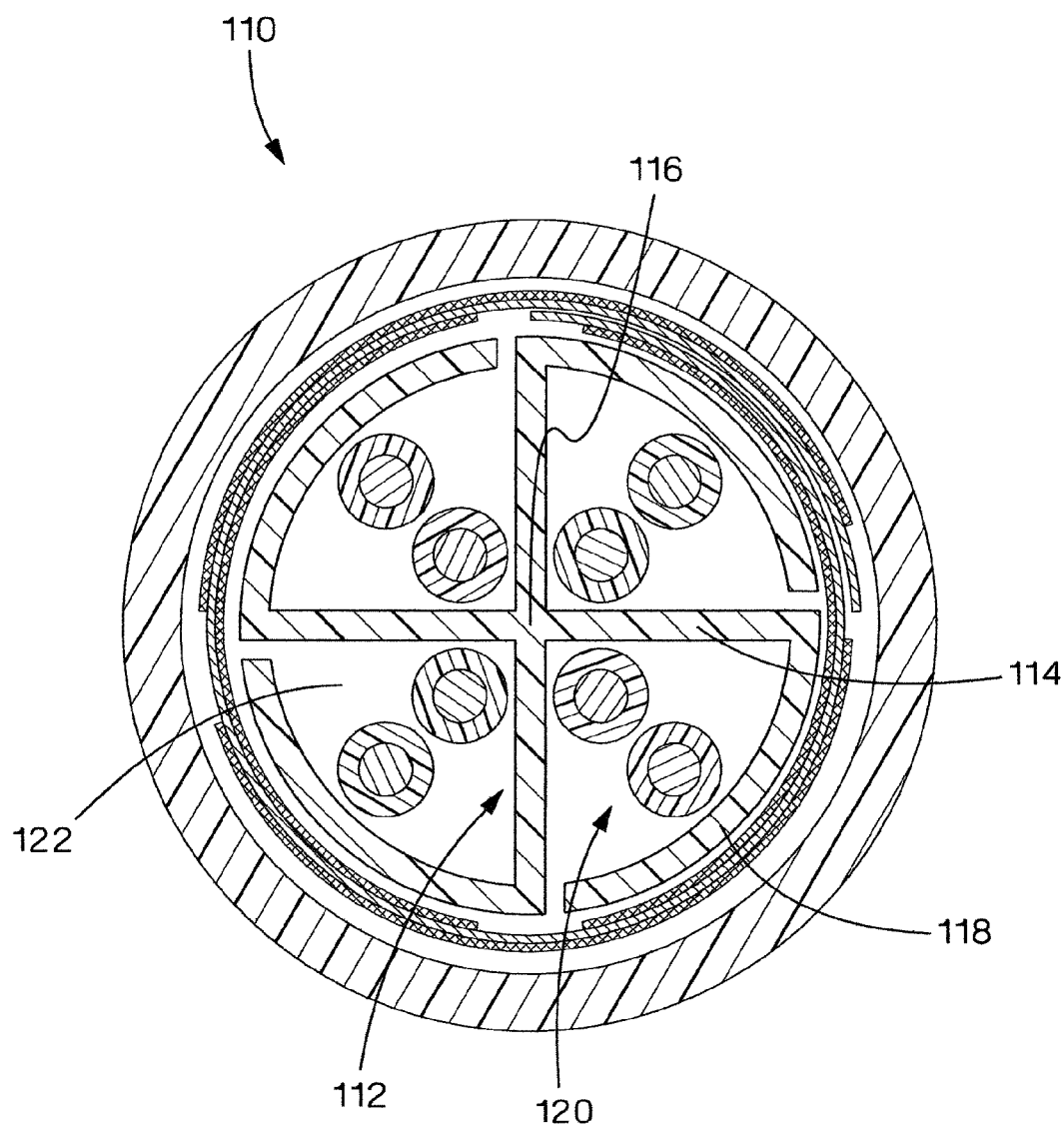
FIG. 13 is a cross-sectional view of a cable according to one embodiment of the present invention having an alternative twisted-pair divider.

FIG. 13 is a cross-sectional view of a cable 110 having an alternative twisted-pair divider 112. The twisted-pair divider 112 has radial crossweb members 114 that extend outwardly from a center 116 of the divider 112 to circumferential crossweb members 118. Twisted pairs 120 of the cable 110 are contained within open regions 122 bordered by the radial and circumferential crossweb members 114 and 118. The circumferential crossweb members 118 serve as an inner insulating layer similar to the layer 30 of FIG. 2. The twisted-pair divider 112 may incorporate a barrier layer comprising conductive segments, similar to the barrier tapes 32, 60, and 80 discussed above.

Figure 14:
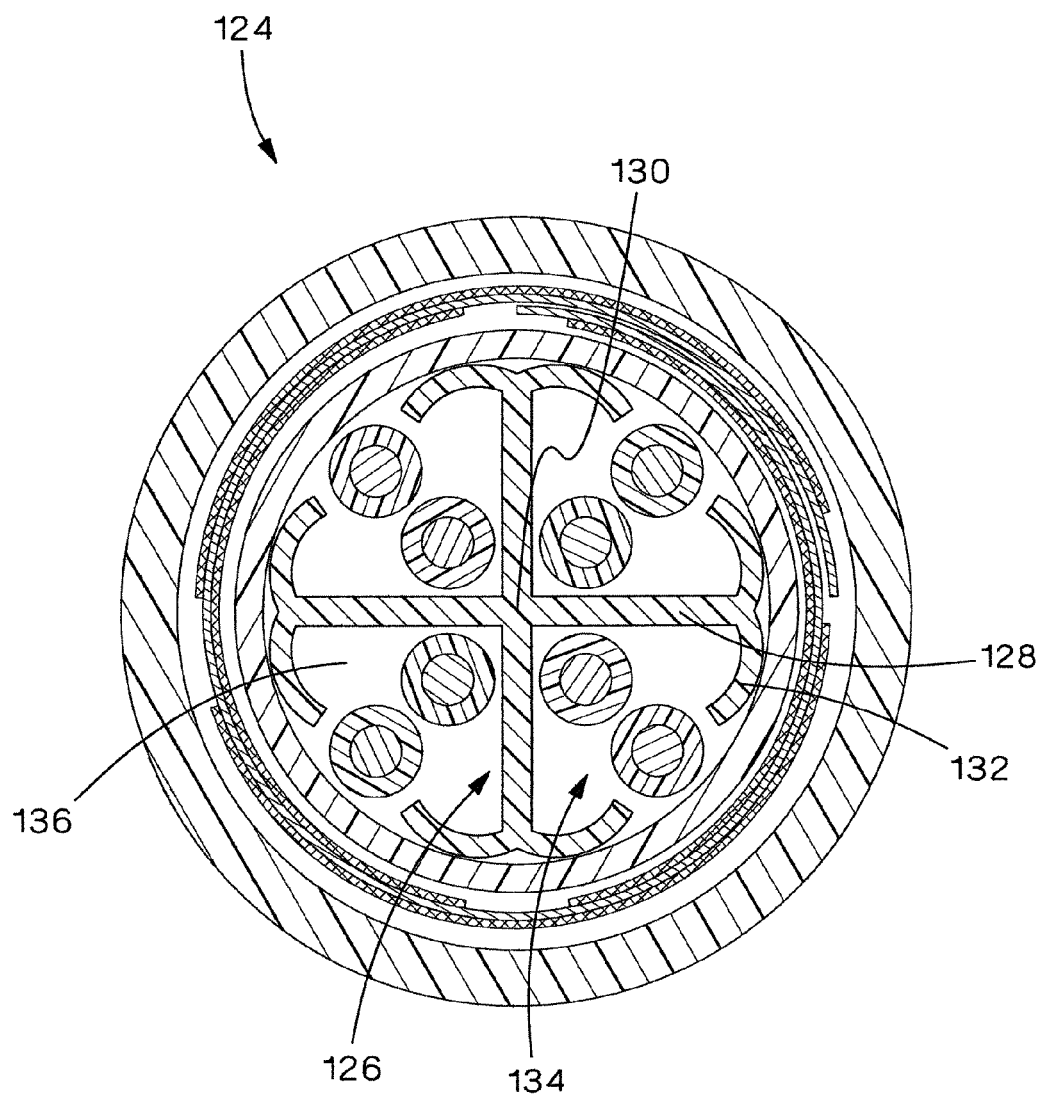
FIG. 14 is a cross-sectional view of a cable according to another embodiment of the present invention having an alternative twisted-pair divider.

FIG. 14 is a cross-sectional view of another cable 124 having an alternative twisted-pair divider 126. The twisted-pair divider 126 has radial crossweb members 128 that extend from a center 130 of the divider 126 and terminate at shortened circumferential crossweb members 132. Twisted pairs 134 of the cable 124 are contained within open regions 136 partially bounded by the radial and shortened circumferential crossweb members 126 and 132. The twisted-pair divider 126 may incorporate a barrier layer comprising conductive segments, similar to the barrier tapes 32, 60, and 80 discussed above.

Figure 15:
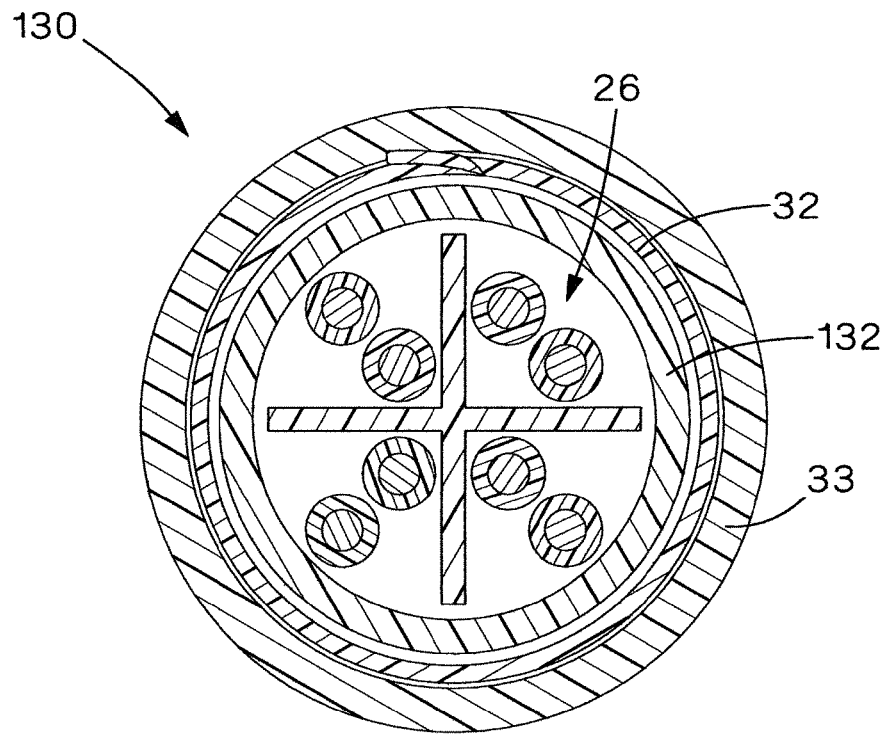
FIG. 15 is a cross-sectional view of a cable incorporating an embossed film as an insulating layer.

FIG. 15 is a cross-sectional view of another cable 130 having an embossed film 132 as the insulating layer between the twisted wire pairs 26 and the barrier tape 32. According to some embodiments, the embossed film 132 is in the form of an embossed tape made of a polymer such as polyethylene, polypropylene, or fluorinated ethylene propylene (FEP). In some embodiments, the embossed film 132 is made of an embossed layer of foamed polyethylene or polypropylene. Unfoamed fire-retardant polyethylene may be used as the base material. Embossing the film 132 provides for an insulating layer having a greater thickness than the thickness of the base material of the film. This produces a greater layer thickness per unit mass than non-embossed solid or foamed films. The incorporation of more air into the layer, via embossing, lowers the dielectric constant of the resulting layer, allowing for an overall lower cable diameter because the lower overall dielectric constant of the layer allows for a similar level of performance as a thicker layer of a material having a higher dielectric constant. The use of an embossed film reduces the overall cost of the cable by reducing the amount of solid material in the cable, and also improves the burn performance of the cable because a smaller amount of flammable material is provided within the cable than if a solid insulating layer is used. The use of an embossed film as the insulting layer has also been found to improve the insertion loss performance of the cable. Insulating layers according to the present invention may be spirally or otherwise wrapped around a cable core.

Figure 16:
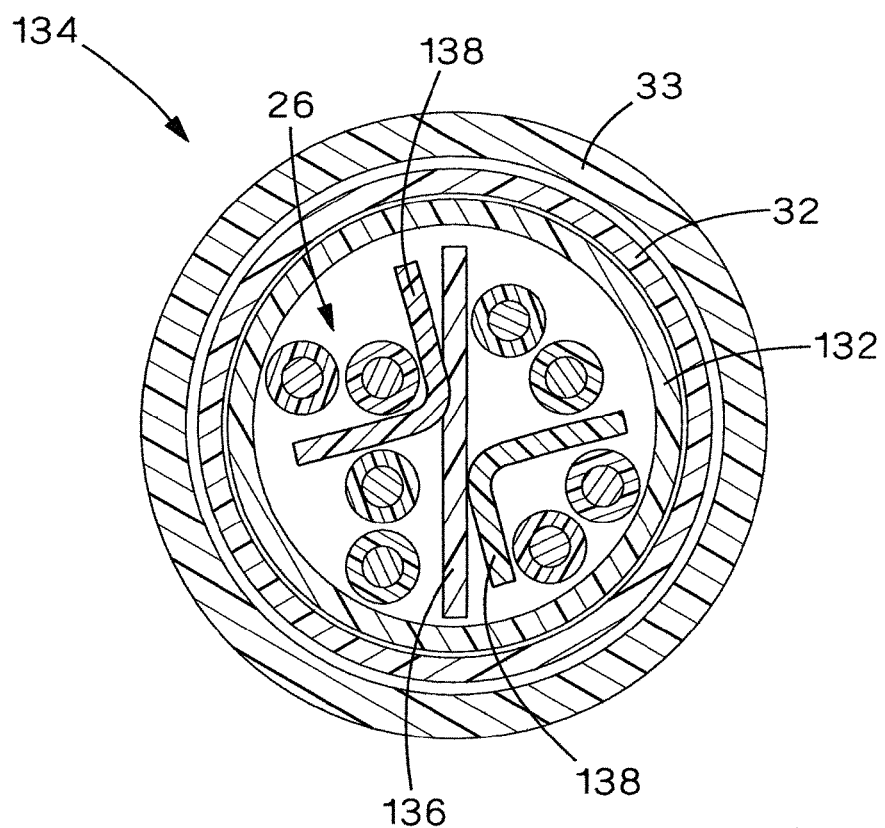
FIG. 16 is a cross-sectional view of a cable incorporating a embossed films as twisted pair separators and as an insulating layer.

FIG. 16 is a cross-sectional view of a cable 134 having an embossed film 132 as the insulating layer between the twisted pairs 26 and the barrier tape 32, and also having embossed films as separators between the individual twisted pairs 26. The separators shown in FIG. 16 include a central straight separator 136 and a pair of bent separators 138. Using embossed films as separators between the twisted wire pairs has many of the same advantages as using an embossed film as the insulating layer, as discussed above.

Figure 17:
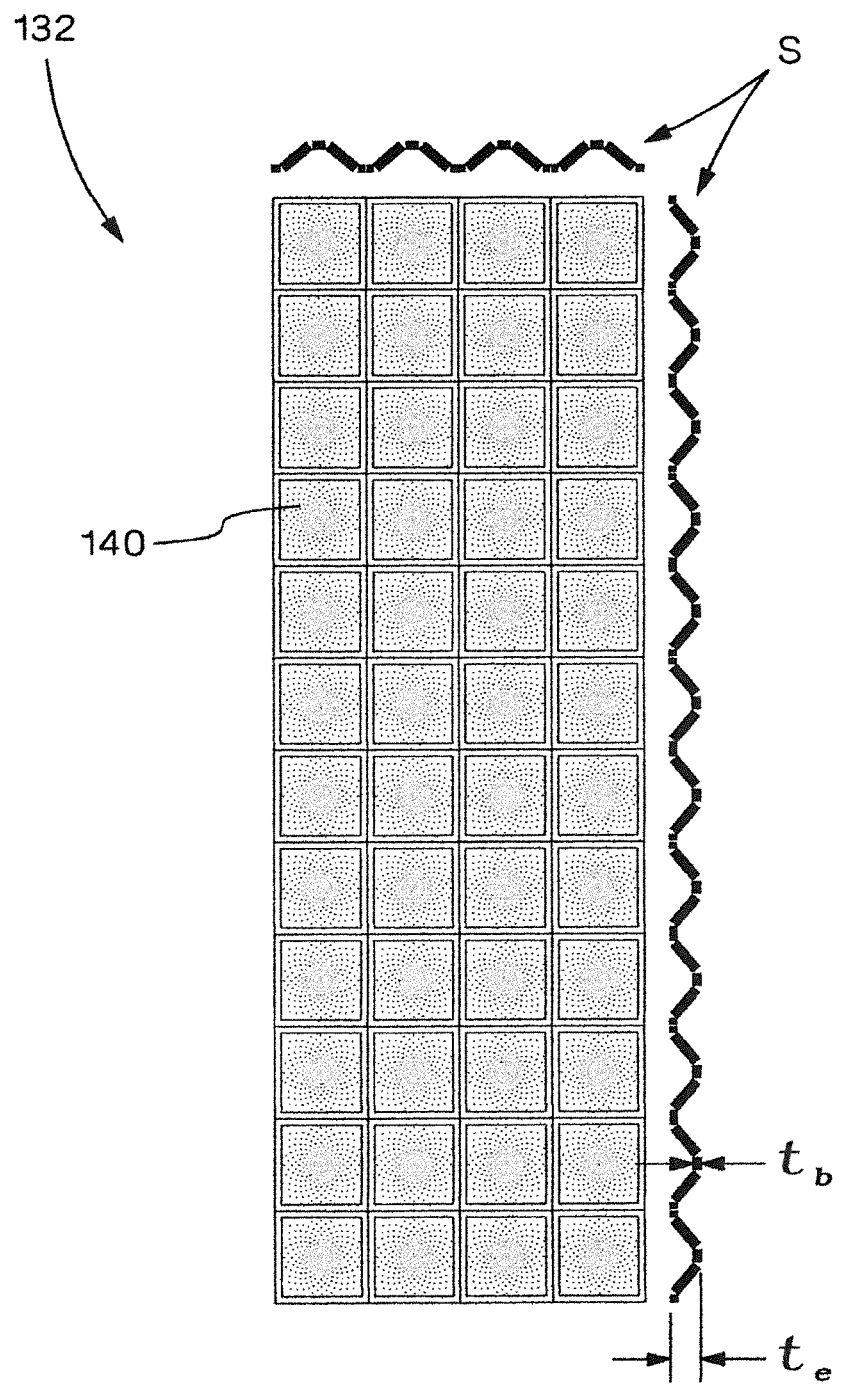
FIG. 17 is a plan view of an embossed film.

FIG. 17 is a plan view of one embodiment of an embossed film 132. Side detail views S are also shown in FIG. 17. In the embodiment shown in FIG. 17, the embossed film 132 takes the form of a repeating pattern of embossed squares 140 in a base material such as polyethylene or polypropylene, either foamed or unfoamed. In a preferred embodiment, a foamed polymer film material is used. The aspect ratio of the embossed film 132 is the ratio between the effective thickness of the embossed film, $t_e$, and the thickness of the base material, $t_b$. Aspect ratios of up to 5, for example with a base material thickness of 3 mils and an effective thickness of 15 mils for the embossed film, are used according to some embodiments. Other useful ratios include a base material thickness of 3 mils and an effective thickness of 14 mils; a base material thickness of 5 mils and an effective thickness of 15 mils. According to some embodiments, base materials in the range of from 1.5 to 7 mils are embossed to effective thicknesses of from 8 mils to 20 mils. While embossed squares 140 are shown in FIG. 17, other shapes may be used, as may a combination of different shapes over the length of the film 132, including the use of patterned embossing.

Barrier tapes according to the present invention can be spirally, or otherwise, wrapped around individual twisted pairs within the cable to improve crosstalk attenuation between the twisted pairs. Further, barrier layers according to the present invention may be incorporated into different structures within a cable, including an insulating layer, an outer insulating jacket, or a twisted-pair divider structure.

From the foregoing, it can be seen that there have been provided features for improved performance of cables to increase attenuation of cable-to-cable crosstalk. While particular embodiments of the present invention have been shown and described, it will be obvious to those skilled in the art that changes and modifications may be made without departing from the invention in its broader aspects. Therefore, the aim is to cover all such changes and modifications as fall within the true spirit and scope of the invention. The matter set forth in the foregoing description and accompanying drawings is offered by way of illustration only and not as a limitation.

We claim:

1. A barrier tape for use in a communication cable having a plurality of twisted pairs of conductors, the communication cable operational at a range of signal frequencies including a highest operational signal frequency, the plurality of twisted pairs of conductors having an average pair lay length, said barrier tape comprising:
   an insulating substrate; and
   at least one barrier layer of conductive segments separated by gaps, said conductive segments having a longitudinal length greater than said average pair lay length and smaller than one quarter of a wavelength of a signal transmitted at the highest operational signal frequency.

2. The barrier tape of claim 1, further comprising an adhesive layer between said insulating substrate and said at least one barrier layer.

3. The barrier tape of claim 1, wherein said longitudinal length is between approximately 1.3 cm and approximately 10 cm.

4. The barrier tape of claim 1, wherein each of said conductive segments includes a transverse width, at least one of said transverse widths being wide enough to overlie at least one of said plurality of twisted pairs in a circumferential direction of said communication cable.

5. The barrier tape of claim 1, wherein said conductive segments are laid out in a grid-like pattern having at least one of two and three rows.

6. A communication cable operational at a range of signal frequencies including a highest operational signal frequency, comprising:
   a core of twisted pairs of conductors having an average pair lay length, said twisted pairs of conductors transmitting signals at said range of signal frequencies;
   a barrier tape at least partially wrapped around said core of twisted pairs of conductors, said barrier tape including an insulating substrate and at least one barrier layer of conductive segments separated by gaps, said conductive segments having a longitudinal length greater than said average pair lay length and smaller than one quarter of a wavelength of a signal transmitted at the highest operational signal frequency.

7. The communication cable of claim 6, wherein said barrier tape further includes an adhesive layer between said insulating substrate and said at least one barrier layer.

8. The communication cable of claim 6, wherein said longitudinal length is between approximately 1.3 cm and approximately 10 cm.

9. The communication cable of claim 6, further including an insulating layer between said core and said at least one barrier layer.

10. The communication cable of claim 6, wherein each of said conductive segments includes a transverse width, at least one of said transverse widths being wide enough to overlie at least one of said plurality of twisted pairs in a circumferential direction of said communication cable.

11. The communication cable of claim 6, wherein said conductive segments are laid out in a grid-like pattern having at least one of two and three rows.

12. The communication cable of claim 6, wherein said core has a cable core twist rate, and wherein said barrier tape is at least partially helically wrapped around said cable core at approximately the same rate as said cable core twist rate.

13. A communication system operational at a range of signal frequencies including a highest operational signal frequency, comprising:
   communication equipment; and
   at least one communication cable connected to said communication equipment,
      said at least one communication cable including a core of twisted pairs of conductors having an average pair lay length, said twisted pairs of conductors transmitting signals at said range of signal frequencies, and
      a barrier tape at least partially wrapped around said core of twisted pairs of conductors, said barrier tape including an insulating substrate and at least one barrier layer of conductive segments separated by gaps, said conductive segments having a longitudinal length greater than said average pair lay length and smaller than one quarter of a wavelength of the signal transmitted at the highest operational signal frequency.

14. The communication system of claim 13, wherein said barrier tape further includes an adhesive layer between said insulating substrate and said at least one barrier layer.

15. The communication system of claim 13, wherein said longitudinal length is between approximately 1.3 cm and approximately 10 cm.

16. The communication system of claim 13, further including an insulating layer between said core and said at least one barrier layer.

17. The communication system of claim 13, wherein said communication equipment is a patch panel.

18. A method for attenuating alien crosstalk between a plurality of communication cables, at least one of said plurality of communication cables is operational at a range of signal frequencies including a highest operational signal frequency, said at least one of said plurality of communication cables includes a core with a plurality of twisted pairs of conductors with an average pair lay length, said method comprising the steps of:
   determining the highest operational signal frequency of said communication cable;
   configuring a barrier tape comprising at least one barrier layer of conductive segments separated by gaps, said conductive segments having a longitudinal length greater than said average pair lay length and smaller than one quarter of a wavelength of a signal transmitted at the highest operational signal frequency; and at least partially wrapping said barrier tape around said core.

19. The method of claim 18, wherein the step of at least partially wrapping said barrier tape around said core includes at least partially wrapping said barrier tape around said core in a helical manner.

20. The method of claim 19, wherein said core has a cable core twist rate, and wherein the step of at least partially wrapping said barrier tape around said core in a helical manner includes wrapping said barrier tape at approximately the same rate as said cable core twist rate.

21. The method of claim 18, wherein the step of at least partially wrapping said barrier tape around said core includes at least partially wrapping said barrier tape around said core in a longitudinal manner.

22. The method of claim 18, wherein the step of at least partially wrapping said barrier tape around said core includes at least partially wrapping said barrier tape around said core such that at least one of said conductive segments overlies at least one of said plurality of twisted pairs of conductors in a circumferential direction of said at least one of said plurality of communication cables.

23. A communication cable, comprising:
a plurality of twisted pairs of conductors in an inner core;
an outer jacket surrounding said plurality of twisted pairs of conductors;
a plurality of conductive segments in a grid-like pattern between said inner core and said outer jacket, said plurality of conductive segments at least partially covering said plurality of twisted pairs of conductors; and
an insulating layer between said plurality of twisted pairs of conductors and said plurality of conductive segments.

24. The communication cable of claim 23, wherein said conductive segments include a longitudinal length, said longitudinal length is between approximately 1.3 cm and approximately 10 cm.

25. The communication cable of claim 23, wherein each of said conductive segments includes a transverse width, at least one of said transverse widths being wide enough to overlie at least one of said plurality of twisted pairs in a circumferential direction of said cable.

26. A communication system, comprising:
communication equipment; and
at least one communication cable connected to said communication equipment,
said at least one communication cable including a plurality of twisted pairs of conductors in an inner core,
an outer jacket surrounding said plurality of twisted pairs of conductors,
a plurality of conductive segments in a grid-like pattern between said inner core and said outer jacket, said plurality of conductive segments at least partially covering said plurality of twisted pairs of conductors, and
an insulating layer between said plurality of twisted pairs of conductors and said plurality of conductive segments.

27. The communication system of claim 26, wherein said conductive segments include a longitudinal length, said longitudinal length is between approximately 1.3 cm and approximately 10 cm.

28. The communication system of claim 26, wherein said communication equipment is a patch panel.

29. The communication system of claim 26, wherein each of said conductive segments includes a transverse width, at least one of said transverse widths being wide enough to overlie at least one of said plurality of twisted pairs in a circumferential direction of said cable.

* * * * *